US007327567B2

(12) United States Patent
Chen et al.

(10) Patent No.: US 7,327,567 B2
(45) Date of Patent: Feb. 5, 2008

(54) MOUNTING APPARATUS FOR POWER SUPPLY

(75) Inventors: Yun Lung Chen, Tu-Chen (TW); Zhao-Yang Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 436 days.

(21) Appl. No.: 10/994,499

(22) Filed: Nov. 22, 2004

(65) Prior Publication Data
US 2005/0117290 A1     Jun. 2, 2005

(30) Foreign Application Priority Data
Dec. 2, 2003   (TW) .............................. 92221213 U

(51) Int. Cl.
*H05K 5/00* (2006.01)
*H05K 7/00* (2006.01)
*H05K 7/16* (2006.01)
*A47B 81/00* (2006.01)

(52) U.S. Cl. ................. 361/686; 361/725; 361/726; 361/727; 312/223.2

(58) Field of Classification Search ................ 361/679, 361/683, 686, 725–727; 312/223.2, 223.3, 312/249.1; 174/503; 248/225.11, 225.21, 248/290.1, 294.1
See application file for complete search history.

(56) References Cited

U.S. PATENT DOCUMENTS

| | | | | |
|---|---|---|---|---|
| 5,777,848 A | * | 7/1998 | McAnally et al. .......... 361/725 |
| 6,341,072 B1 | * | 1/2002 | Liao ........................... 361/825 |
| 6,462,940 B1 | * | 10/2002 | Diaz et al. ................... 361/683 |
| 6,530,628 B1 | * | 3/2003 | Huang et al. ............. 312/223.2 |
| 6,685,503 B1 | * | 2/2004 | Huang et al. ............... 439/527 |
| 6,751,100 B2 | * | 6/2004 | Chen .......................... 361/725 |
| 2004/0223298 A1 | * | 11/2004 | Chen et al. ................. 361/683 |
| 2005/0111169 A1 | * | 5/2005 | Chen et al. ................. 361/679 |
| 2005/0122673 A1 | * | 6/2005 | Chen et al. ................. 361/683 |
| 2005/0185372 A1 | * | 8/2005 | Chen et al. ................. 361/685 |

FOREIGN PATENT DOCUMENTS

TW         88219428         9/2001

* cited by examiner

*Primary Examiner*—Lisa Lea-Edmonds
*Assistant Examiner*—Anthony M Haughton
(74) *Attorney, Agent, or Firm*—Wei Te Chung

(57) ABSTRACT

A power supply mounting apparatus includes a chassis (40), a mounting board (20) attached to the power supply, and a mounting bracket (30). The chassis includes a rear panel (50) with an opening (52), and first and second side panels (50, 70). The mounting board forms a pair of mounting hooks (25) at each side thereof. The mounting bracket includes two mounting portions (31, 32) and a connecting portion (33). Each mounting portion defines slits (35) and locking holes (36). The rear panel forms catches slidably engaging in the locking holes. After the power supply slides in the chassis with the mounting hooks extending in the corresponding slits, the mounting bracket is moved horizontally so that the hooks hook the rear panel. The second side panel is attached to the chassis to prevent the mounting bracket from leaving the chassis.

19 Claims, 6 Drawing Sheets

MOUNTING APPARATUS FOR POWER SUPPLY

BACKGROUND OF THE INVENTION

1. Field of the Invention

The present invention relates to mounting apparatuses for power supplies, and particularly to a mounting apparatus for readily and securely attaching a power supply to a computer chassis.

2. Description of the Related Art

Generally speaking, a power supply is necessarily to be assembled in a computer enclosure. The power supply is often directly attached to a rear panel of the computer enclosure by a plurality of screws. However, this requires extra tools such as screwdrivers in assembly or disassembly, which is unduly laborious and time-consuming. Additionally, this requires a long assembly line, which lowers assembly efficiency. Furthermore, an unworkable work site will lead to paralysis of the whole assembly line.

Another conventional mounting way is to assemble a power supply to a bracket, and then attach the bracket together with the power supply to the computer enclosure. By this way, the power supply is assembled outside the assembly line, thereby avoiding the paralysis of the whole assembly line when an unworkable work site occurs. Examples are disclosed in Taiwan Patent Application No. 88219428. However, screws are still needed to fix the bracket to the computer enclosure. When maintaining or repairing the power supply, screwdrivers are needed to unscrew the screws to take the power supply off.

Thus, a mounting apparatus for a power supply which solves the above-mentioned problems is strongly desired.

SUMMARY OF THE INVENTION

Accordingly, an object of the present invention is to provide a mounting apparatus with a simple structure which readily allows attachment and removal of a power supply to and from a computer chassis.

To achieve the above-mentioned object, a mounting apparatus in accordance with the preferred embodiment of the present invention is used to mount a power supply. The mounting apparatus comprises a computer chassis, a mounting board attached to the power supply, and a mounting bracket. The chassis comprises a rear panel with an opening, and first and second side panels. The mounting board forms a pair of mounting hooks at each side thereof. The mounting bracket comprises two mounting portions and a connecting portion. Each mounting portion defines a plurality of slits corresponding to the mounting hooks, and a plurality of locking holes. The rear panel forms a plurality of catches slidably engaging in the locking holes. After the power supply slides in the computer chassis with the mounting hooks extending in the corresponding slits, the mounting bracket is moved horizontally so that the hooks hook the rear panel. The second side panel is then attached to the chassis to prevent the mounting bracket from leaving the chassis.

In disassembly, the second side panel is removed, the mounting bracket is moved back to its original position, so that the mounting hooks disengage with the rear panel, and the power supply can be easily taken out from the computer chassis.

In this invention, the support bracket is received in the drive bracket with the pins slid in the slots, and by means of the latch attached to the drive bracket to secure one of the pins, so that the combined data storage device and support bracket is attached to the drive bracket. That is to say, the data storage device is secured to the drive bracket without screws, therefore simplifies the attachment and removal procedures.

Other objects, advantages and novel features of the present invention will be drawn from the following detailed description of a preferred embodiment of the present invention with attached drawings, in which:

DETAILED DESCRIPTION OF THE INVENTION

Figure 1:
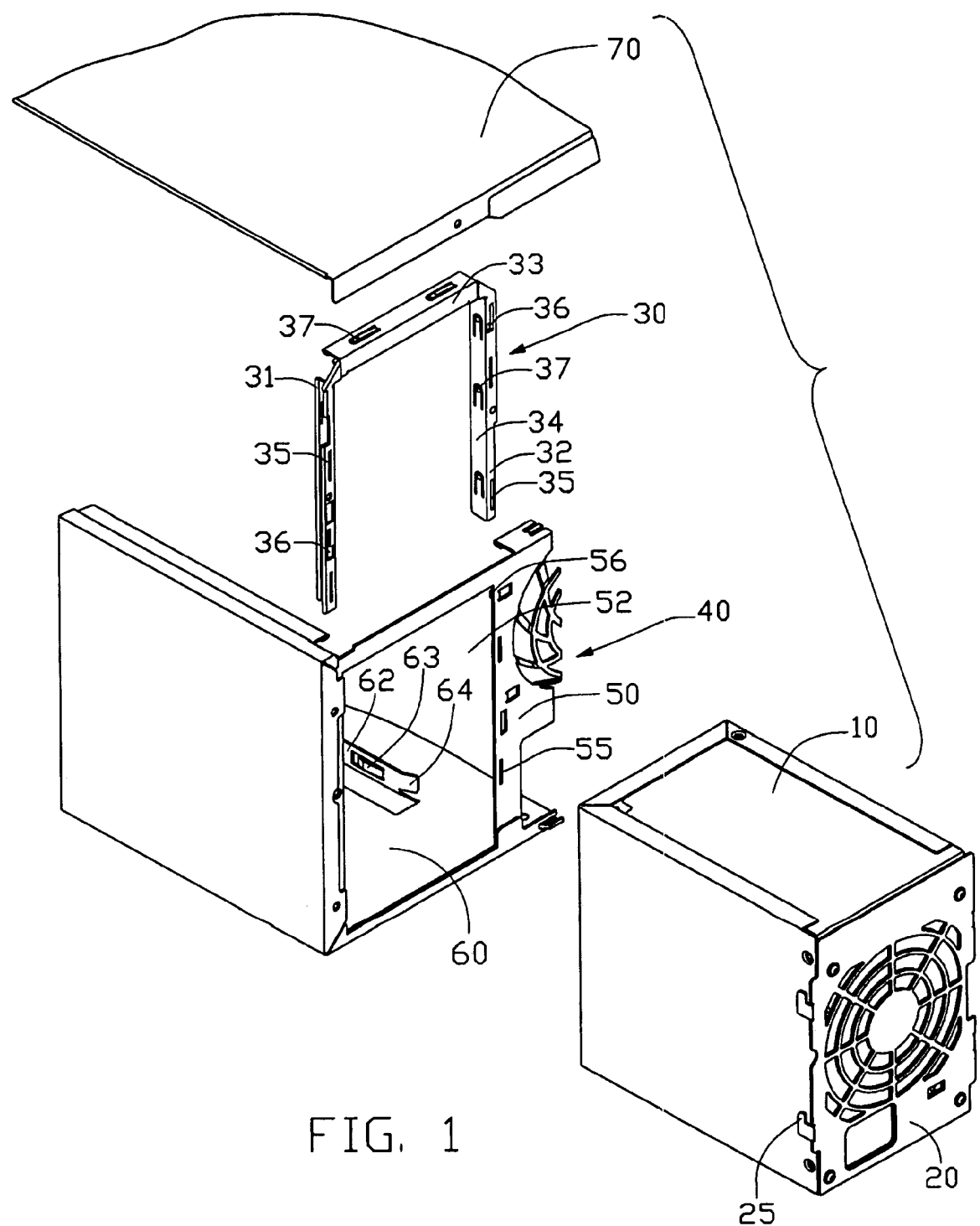
FIG. 1 is an exploded, isometric view of a mounting apparatus in accordance with the present invention, together with a power supply, the mounting apparatus comprising a computer chassis, a mounting board and a mounting bracket.
Figure 2:
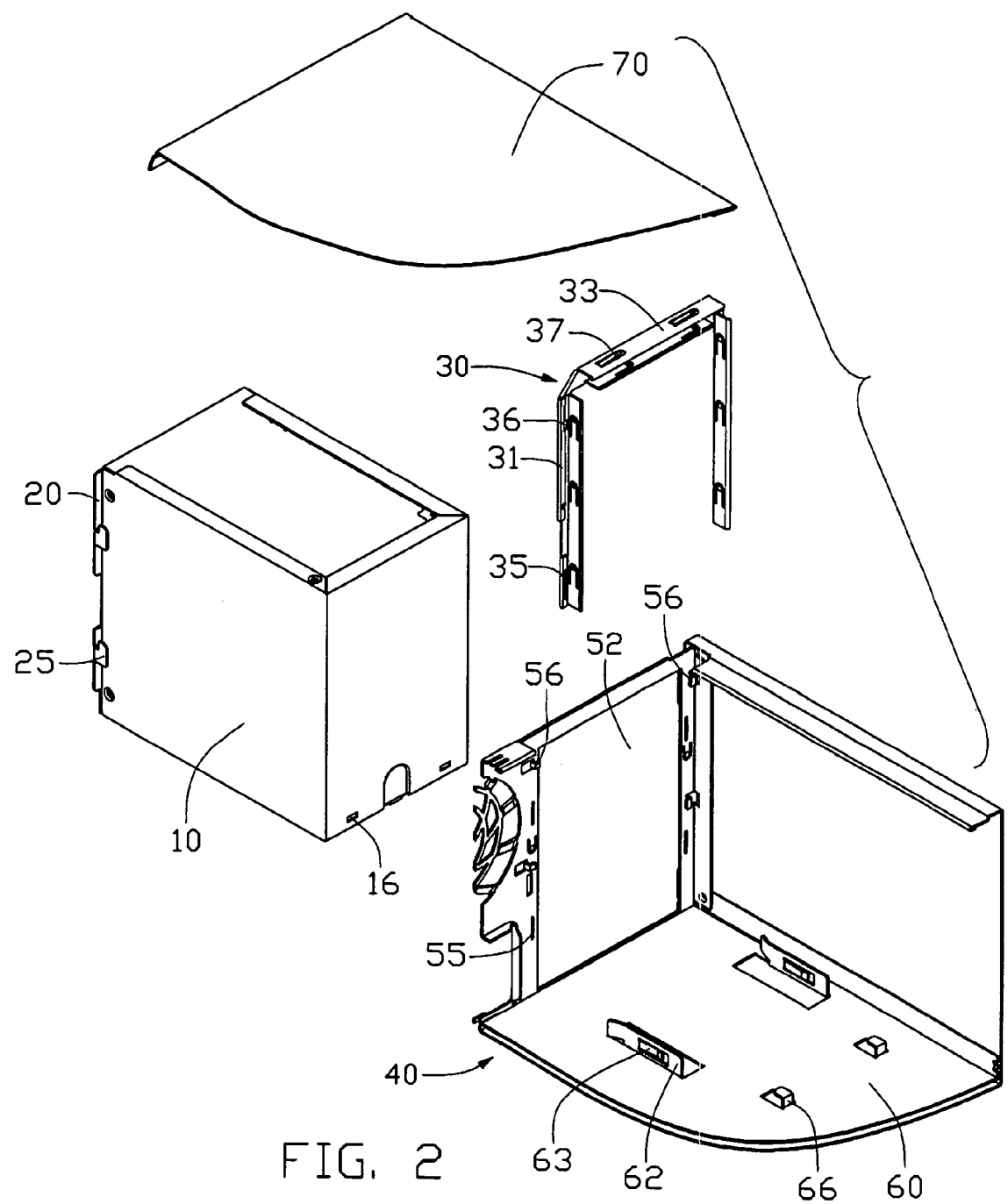
FIG. 2 is similar to FIG. 1, but viewed from another aspect.

Referring to FIGS. 1 and 2, a mounting apparatus in accordance with the preferred embodiment of the present invention is used for securing a power supply 10. The mounting apparatus comprises a computer chassis 40, a mounting board 20, and a mounting bracket 30.

The box-like power supply 10 comprises a plurality of ventilating apertures (not shown) at a rear wall thereof, and a pair of fixing holes 16 defined in a front wall thereof.

The computer chassis 40 comprises a rear panel 50, a first side panel 60 extending from one side of the rear panel 50, and a second side panel 70 detachable attached to the other side of the rear panel 50. A rectangular opening 52 is defined in an upper portion of the rear panel 50, having a size fitting the power supply 10. Two pairs of through holes 55 are defined respectively in the rear panel 50 at upper and lower sides of the opening 52. Two pairs of L-shaped catches 56 are formed inwardly from an inner face of the rear panel 50 at the upper and lower sides of the opening 52. A pair of guiding plates 62 is stamped inwardly from the first side panel 60, respectively corresponding to the upper and lower sides of the opening 52. A resilient finger 63 is stamped from each guiding plate 62. A slanted guiding lip 64 is formed from a rear end of each guiding plate 62. A pair of fixing hooks 66 is formed inwardly from the first side panel 60 corresponding to the fixing holes 16 of the power supply 10.

The mounting board 20 may be attached to a rear wall of the power supply by screws or other conventional means. A plurality of ventilating apertures (not labeled) is defined in the mounting board 20 corresponding to the ventilating apertures of the power supply 10. The mounting board 20 respectively forms two pairs of mounting hooks 25 at upper and lower edges thereof.

The mounting bracket 30 is generally U-shaped, and is integrally made by stamping and bending a piece of metal sheet. The mounting bracket 30 comprises two parallel mounting portions 31, 32, and a connecting portion 33 connecting the mounting portions 31, 32. Two pairs of slits 35 are respectively defined in the mounting portions 31, 32 corresponding to the through holes 55 of the rear panel 50. Two pairs of L-shaped locking holes 36 are defined in the mounting portions respectively corresponding to the catches 56 of the rear panel 50. A flange 34 is formed from each of the mounting portions 31, 32 and the connecting portion 33. A plurality of resilient tabs 37 is formed at the flanges 34.

Figure 3:
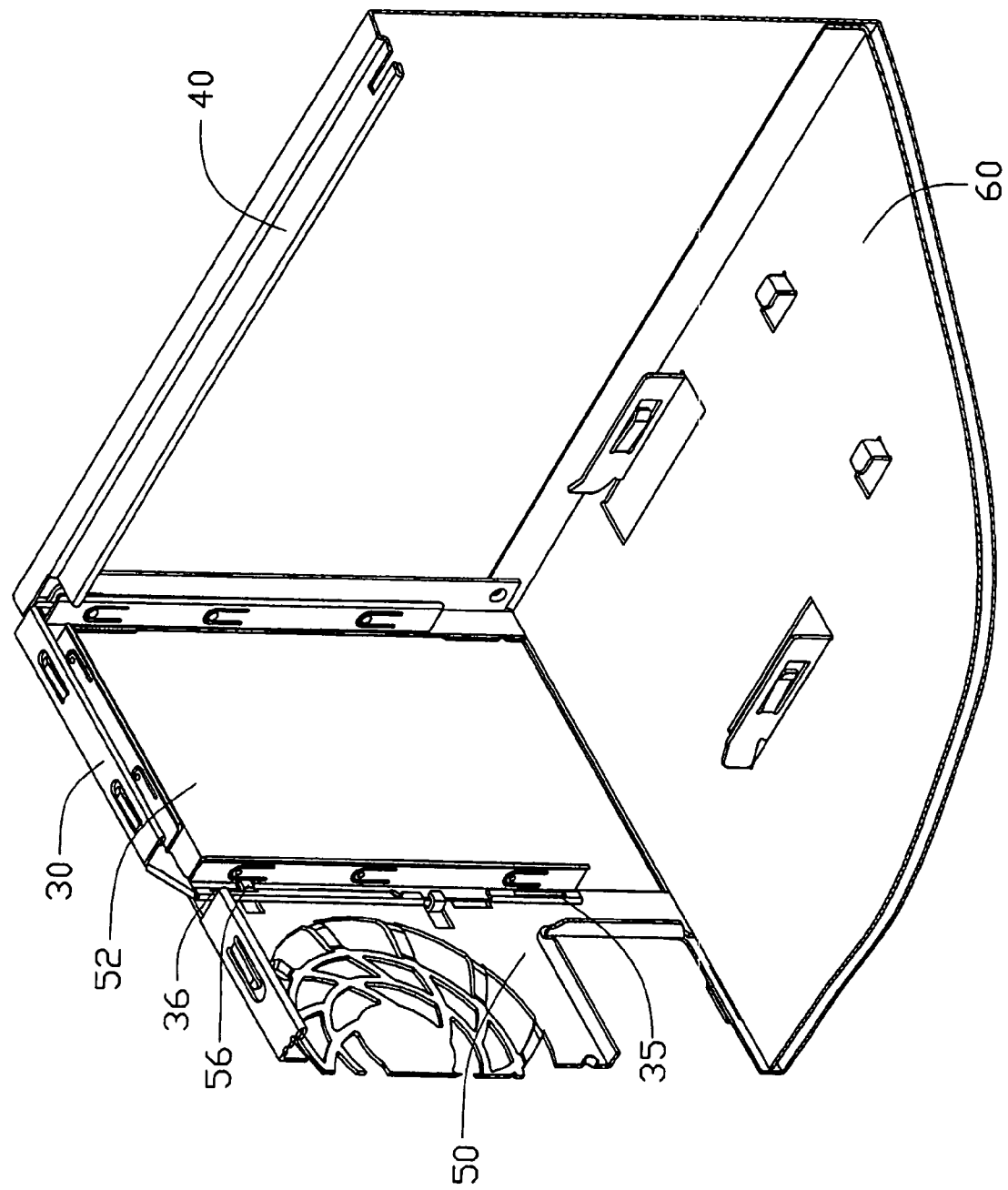
FIG. 3 is a pre-assembled view showing the mounting bracket of FIG. 1 preliminarily attached to the computer chassis.

Referring also to FIG. 3, the second side panel 70 is detached, the mounting bracket 30 is attached to the rear panel 50. The catches 56 of the rear panel 50 enter the locking holes 36 from larger ends thereof, and are slidably received in the locking holes 36. The mounting bracket 30 is thereby slidably attached to the rear panel 50.

Figure 4:
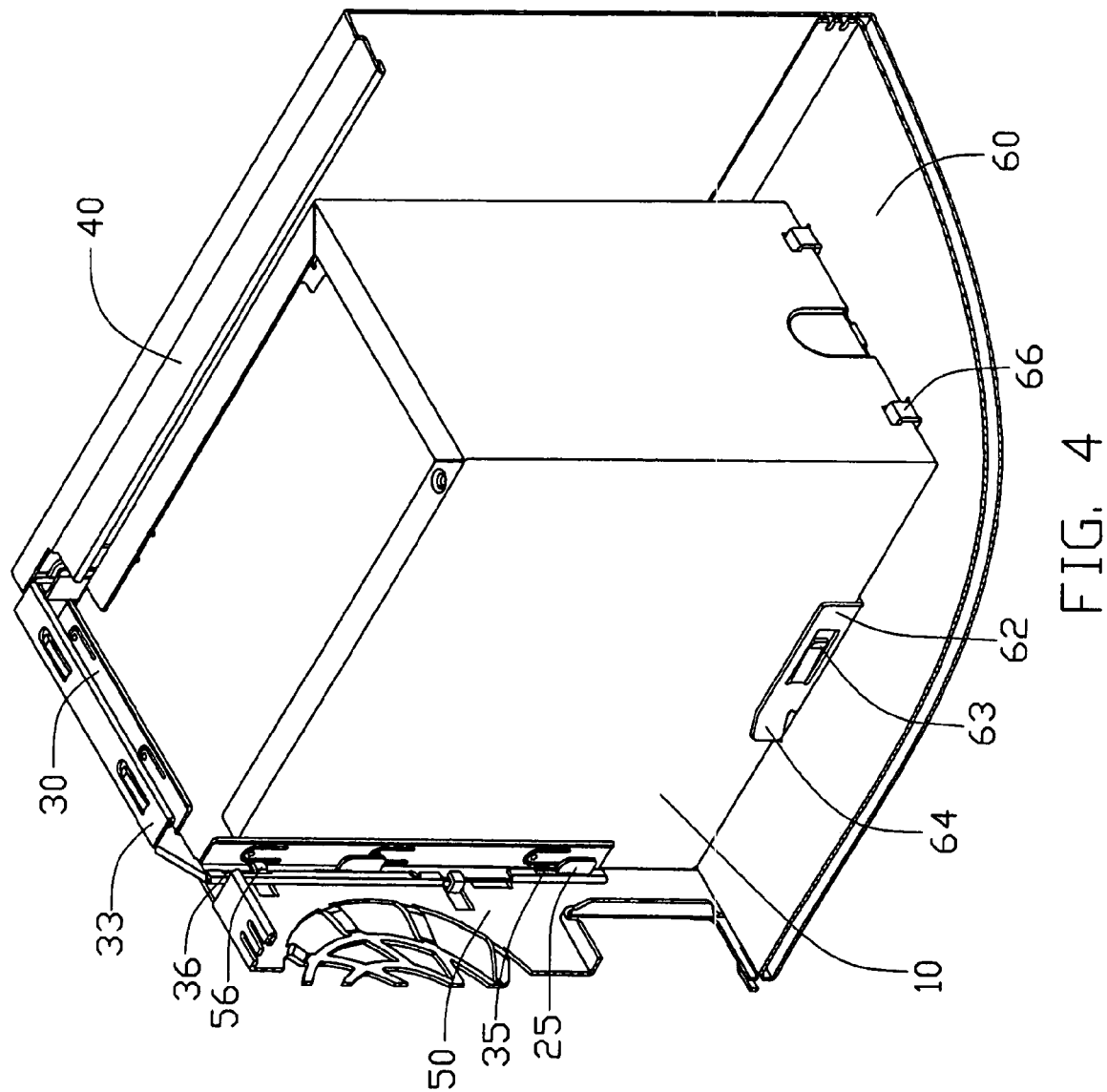
FIG. 4 is an assembled view of FIG. 1, showing the power supply received in the computer chassis, and the mounting bracket located at a first position.
Figure 5:
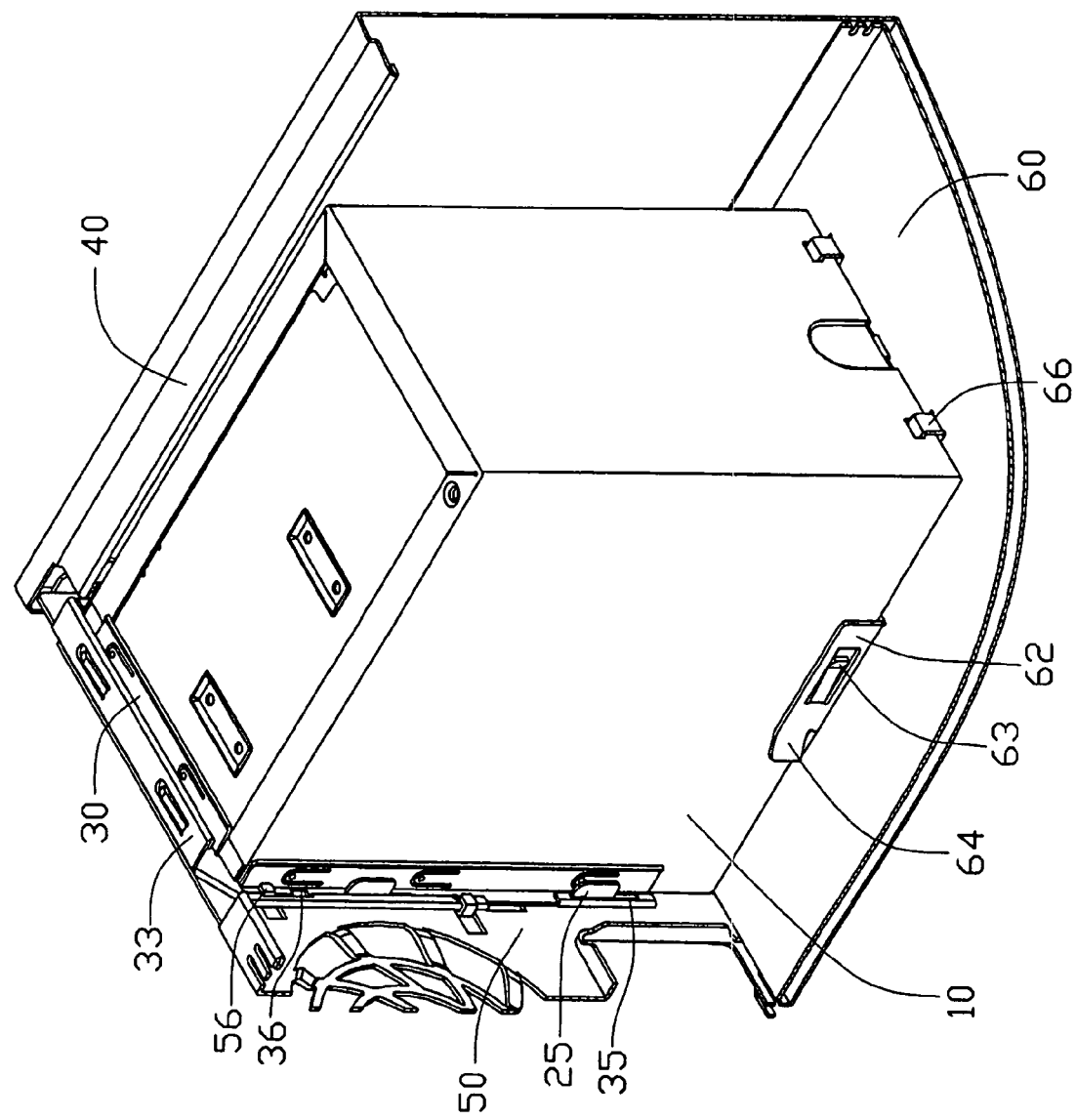
FIG. 5 is similar to FIG. 4, but showing the mounting bracket located at a second position to engage the power supply.
Figure 6:
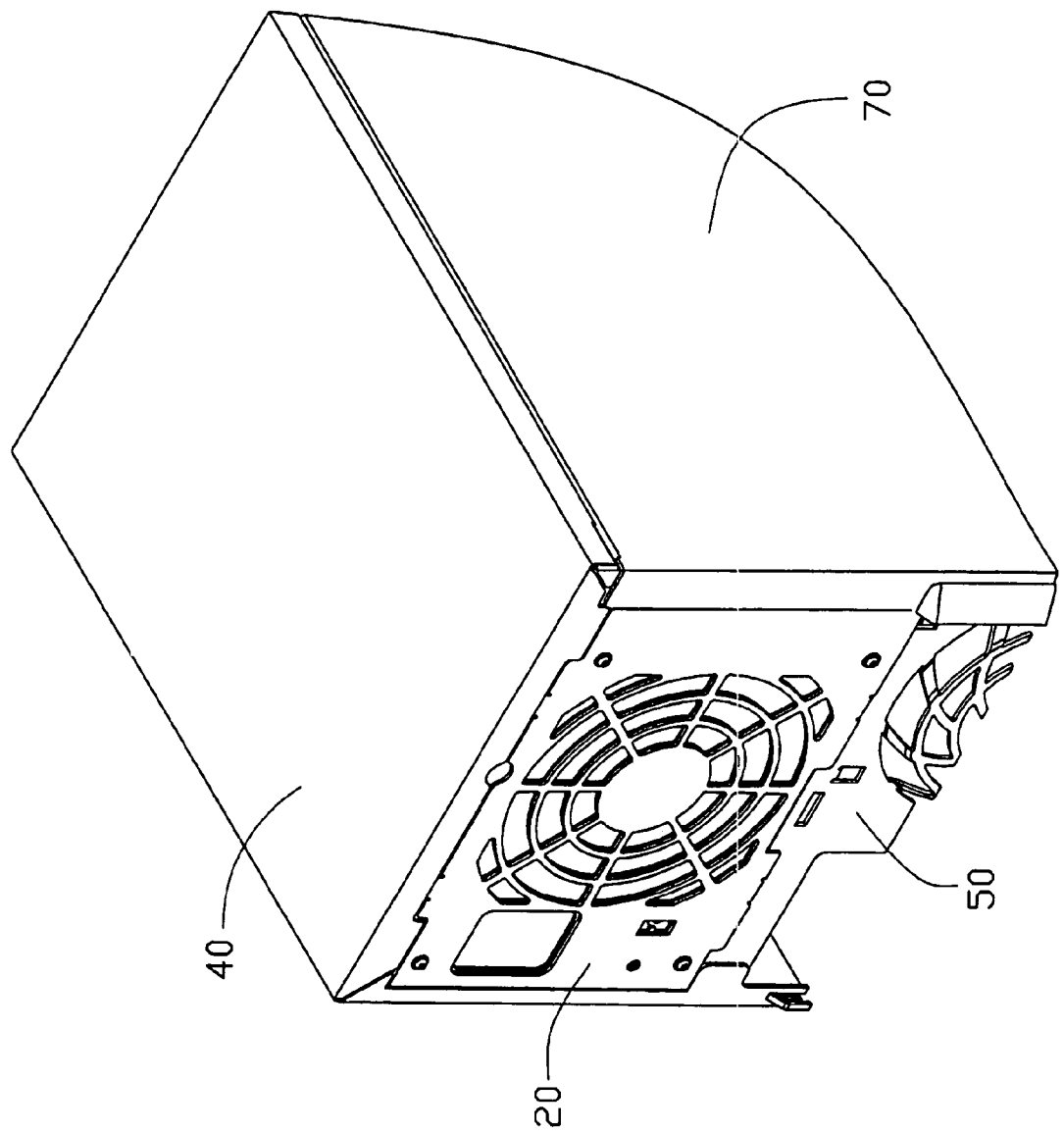
FIG. 6 is a complete assembled view of FIG. 1, showing a side panel being attached to the computer chassis.

Referring also to FIGS. 4-6, when the mounting bracket 30 is moved to a place where the slits 35 are in alignment with the through holes 55, the mounting bracket 30 is located at a first position. The power supply 10 fixed with the mounting board 20 enters the opening 52 of the rear panel 50, and slides along the guiding plates 62 of the first side panel 60 until the fixing holes 16 of the power supply 10 engages with the fixing hooks 66 of the first side panel 60. The mounting hooks 25 of the mounting board 20 extend through the through holes 55 of the rear panel 50 and the slits 35 of the mounting bracket 30. Simultaneously, the resilient fingers 63 of the guiding plates 62 of the first side panel 60 and the resilient tabs 37 of the flanges 34 of the mounting bracket 30 are respectively pressing the power supply 10. Move the mounting bracket 30 toward the first side panel 60 so that the mounting hooks 25 engages with the mounting bracket 30 in the slits 35, thereby the power supply 10 are secured in the computer bracket 40. The catches 56 of the rear panel 50 enter smaller ends of the locking holes 36 of the mounting bracket 30. At this time, the mounting bracket is located at a second position. The second side panel 70 is then attached to the computer chassis 40 to secure the connecting portion 33 of the mounting bracket 30. The mounting bracket 30 is prevented from disengaging from the computer chassis 40, the power supply 10 is thus completely secured in the computer chassis 40.

In disassembly, the second side panel 70 is detached from the computer chassis 40, then the mounting bracket 30 is pulled from the second position to the first position, so that the mounting hooks 25 disengage from the mounting bracket 30. The power supply 10 is then easily taken out from the computer chassis 40.

The final securing of the mounting bracket 30 can be achieved by other means than the second panel 70, for example, by other securing means at the rear panel 50. Additionally, if the slits 35 of the mounting bracket 30 appear in the opening 52 after the mounting bracket 30 is attached to the rear panel 50, the through holes 55 can be omitted and the mounting hooks 25 can directly engage in the locking holes 36.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A mounting apparatus for securing a power supply, comprising:
   a chassis comprising a rear panel and a first side panel arranged at one side of the rear panel, an opening defined in the rear panel, a guiding plate formed from the first side panel; and
   a mounting board adapted to be attached to a rear wall of the power supply, and forming at least one mounting hook at each of opposite sides of the mounting board;
   a mounting bracket comprising a pair of mounting portions which slidably attached to the rear panel at opposite sides of the opening, at least one slit defined in each of the mounting portions corresponding to said mounting hook;
   wherein the power supply enters the opening and slides along the guiding plate, said mounting hooks of the mounting board respectively enter corresponding slits of the mounting bracket, the mounting bracket is moved to an engagement position so that said mounting hooks engage with the mounting bracket in said slits respectively.

2. The mounting apparatus as described in claim 1, wherein a front wall of the power supply defines at least one fixing hole, the first side panel defines at least one fixing hook engages in said fixing hole.

3. The mounting apparatus as described in claim 1, wherein the rear panel forms two L-shaped catches at said sides of the opening respectively, for engaging with the mounting portions of the mounting bracket.

4. The mounting apparatus as described in claim 3, wherein the mounting portions of the mounting bracket defines two locking holes respectively, each of the locking holes defines a larger end and a smaller end, and wherein the catches extend through corresponding larger ends of the locking holes, and then slide to corresponding smaller ends.

5. The mounting apparatus as described in claim 1, wherein at least one through hole is defined in each of said sides of the opening corresponding to said slit of the mounting bracket, said mounting hook extends through said through hole and enters said slit.

6. The mounting apparatus as described in claim 1, wherein the guiding plate forms a resilient finger to press the power supply.

7. The mounting apparatus as described in claim 1, wherein the guiding plate forms a slanted guiding lip at a rear end thereof for facilitating entry of the power supply.

8. The mounting apparatus as described in claim 1, wherein the mounting bracket further comprises a connecting portion connecting the mounting portions.

9. The mounting apparatus as described in claim 8, wherein the a plurality of resilient tabs is defined at at least one of the connecting portion and the mounting portions, for pressing the power supply.

10. The mounting apparatus as described in claim 1, wherein the chassis further comprises a second side panel for preventing the mounting bracket from leaving the engagement position.

11. A mounting apparatus assembly comprising:
   a power supply defining at least one fixing hole at a front wall thereof;
   a computer chassis comprising a rear panel and a first side panel, an opening defined in the rear panel for entry of the power supply, at least one fixing hook formed at the first side panel to engage in said fixing hole;
   a mounting board arranged at a rear wall of the power supply, at least one mounting hook extending from the mounting board toward the rear panel; and
   a mounting bracket movably attached to the rear panel beside the opening, and defining at least one slit corresponding to said mounting hook;
   wherein the mounting hook is movable between a first position in which said mounting hook is alignedly received in said slit, and a second position in which said mounting hook hooks the mounting bracket beside said slit.

12. The mounting apparatus assembly as described in claim 11, wherein the computer chassis further comprises a second side panel abutting the mounting bracket to prevent the mounting bracket from leaving the second position.

13. The mounting apparatus assembly as described in claim 11, wherein the mounting bracket comprises two opposite mounting portions and a connecting portion connecting the mounting portions.

14. The mounting apparatus assembly as described in claim 13, wherein a plurality of said slit is defined in the mounting portions.

15. The mounting apparatus assembly as described in claim 11, wherein at least one through hole is defined in the rear panel beside the opening to align with said mounting hook of the mounting board.

16. The mounting apparatus assembly as described in claim 11, wherein the first side panel forms at least one guiding plate for the power supply sliding thereon.

17. The mounting apparatus assembly as described in claim 16, wherein there is a pair of opposite guiding plates formed from the first side panel for sandwiching the power supply therebetween, each of the guiding plates forms a resilient finger for pressing the power supply.

18. The mounting apparatus assembly as described in claim 11, wherein the rear panel forms at least one catch beside the opening, the mounting bracket defines at least one locking hole, and wherein when the mounting bracket is in the first position, said catch enters said locking hole from a larger end of said locking hole, when the mounting bracket is in the second position, said catch enters a smaller end of said locking hole thereby attaching the mounting bracket to the rear panel.

19. A mounting apparatus assembly comprising:

a power supply;

a computer chassis comprising a rear panel and a first side panel, an opening defined in the rear panel for entry of the power supply in a first direction;

means for retaining the power supply with regard to the computer chassis in position without movement in said first direction and other directions perpendicular to said first direction except a third direction opposite to said first direction;

a mounting bracket attached to an interior surface of the rear panel beside the opening, and moveable in a second direction perpendicular to said first direction; and one of said power supply and said mounting bracket defining a hook, the other of said power supply and said mounting bracket defining a slit being capable of receiving said hook therein; wherein when the mounting bracket is located in a first position, the power supply is allowed to enter the opening in said first direction under a condition that the hook passes the slit due to an aligning structure relationship therebetween and said means generally retains the power supply while said power supply is able to be withdrawn along said third direction opposite to said first direction; when the mounting bracket is located in a second position, the hook can no longer pass the slit due to an offset structure relationship therebetween, and thus the power supply can not be withdrawn in said third direction.

\* \* \* \* \*